(12) United States Patent
Sander et al.

(10) Patent No.: US 9,217,367 B2
(45) Date of Patent: Dec. 22, 2015

(54) METHOD FOR OPERATING A GAS TURBINE POWER PLANT WITH FLUE GAS RECIRCULATION

(75) Inventors: Frank Sander, Bielefeld (DE); Felix Guethe, Basel (CH); Frank Graf, Nussbaumen (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 371 days.

(21) Appl. No.: 13/560,551

(22) Filed: Jul. 27, 2012

(65) Prior Publication Data

US 2013/0047576 A1 Feb. 28, 2013

(30) Foreign Application Priority Data

Jul. 27, 2011 (EP) ...................................... 11175516

(51) Int. Cl.
*F02C 3/34* (2006.01)
*F02C 1/00* (2006.01)
*F02C 1/08* (2006.01)

(52) U.S. Cl.
CPC . *F02C 3/34* (2013.01); *F02C 1/005* (2013.01); *F02C 1/08* (2013.01); *F05D 2270/082* (2013.01)

(58) Field of Classification Search
CPC ............... F02C 1/08; F02C 3/34; F02C 1/005
USPC ................... 60/39.5, 39.52, 39.182
See application file for complete search history.

(56) References Cited

U.S. PATENT DOCUMENTS

| | | | |
|---|---|---|---|
| 4,928,635 A * | 5/1990 | Shelor | 122/7 R |
| 7,124,589 B2 * | 10/2006 | Neary | 60/784 |
| 7,536,252 B1 | 5/2009 | Hibshman, II et al. | |
| 8,015,822 B2 | 9/2011 | Ranasinghe et al. | |
| 2004/0148129 A1 * | 7/2004 | Gotoh et al. | 702/183 |
| 2004/0206064 A1 * | 10/2004 | Reiter et al. | 60/39.45 |
| 2006/0137665 A1 * | 6/2006 | Khair et al. | 123/568.12 |

(Continued)

FOREIGN PATENT DOCUMENTS

| | | |
|---|---|---|
| DE | 10 2008 002 870 A1 | 12/2008 |
| DE | 10 2008 037 383 A1 | 4/2009 |

(Continued)

OTHER PUBLICATIONS

European Search Report issued on Dec. 1, 2011 for European Application No. 11175516.1.

(Continued)

*Primary Examiner* — Gerald L Sung
*Assistant Examiner* — Scott Walthour
(74) *Attorney, Agent, or Firm* — Buchanan Ingersoll & Rooney PC

(57) ABSTRACT

A method is provided for operating a gas turbine power plant with flue gas recirculation, in which the flue gases are split into a first flue gas flow for recirculation into an intake flow of the gas turbine and into a second flue gas flow for discharging to the environment. The first flue gas flow is cooled in a recooler before its mixing with ambient air for forming the intake flow. The recirculation flow, after being recooled, is reheated in order to avoid condensation of vaporous water contained in the recycled flue gases during cooling as a result of the mixing with the ambient air. A gas turbine power plant is provided with flue gas recirculation, which includes a heat exchanger for reheating the recirculation flow after being recooled.

37 Claims, 3 Drawing Sheets

(56) References Cited

U.S. PATENT DOCUMENTS

| | | |
|---|---|---|
| 2008/0309087 A1 | 12/2008 | Evulet et al. |
| 2009/0145126 A1 | 6/2009 | Chillar et al. |
| 2009/0218821 A1 | 9/2009 | Elkady et al. |
| 2010/0126181 A1* | 5/2010 | Ranasinghe et al. ............ 60/782 |
| 2011/0048002 A1 | 3/2011 | Taylor et al. |

FOREIGN PATENT DOCUMENTS

| | | |
|---|---|---|
| DE | 10 2009 044 588 A1 | 5/2010 |
| EP | 0 718 470 A2 | 6/1996 |
| GB | 2473098 A | 3/2011 |
| JP | 2001-012213 | 1/2001 |
| JP | A-2009-108848 | 5/2009 |
| JP | A-2010-530490 | 9/2010 |
| WO | WO 2010/072710 A2 | 7/2010 |
| WO | WO 2010/072729 A2 | 7/2010 |

OTHER PUBLICATIONS

Oct. 6, 2014 Japanese Office Action issued in Japanese Patent Application No. 2012-164543 (with English language translation).

* cited by examiner

METHOD FOR OPERATING A GAS TURBINE POWER PLANT WITH FLUE GAS RECIRCULATION

RELATED APPLICATIONS

This application claims priority under 35 U.S.C. §119 to European Patent Application No. 11175516.1 filed in Europe on Jul. 27, 2011, the entire content of which is hereby incorporated by reference in its entirety.

FIELD

The present disclosure relates to a method for operating a gas turbine with flue gas recirculation, and to a gas turbine power plant for implementing the method.

BACKGROUND INFORMATION

The recirculation of flue gases is a technology which can basically be used for the most diverse purposes in gas turbines. Thus, flue gas recirculation is proposed, for example, for the reduction of $NO_x$ emission or for a reduction of the flue gas flow which is to be discharged. During the recirculation of flue gases in a gas turbine, a significant proportion of the flue gas is branched from the overall flue gas flow and, after being cooled and scrubbed, may be fed to the intake mass flow of the gas turbine or to the compressor. The recycled flue gas flow is mixed with fresh ambient air, and this mixture is then fed to the compressor.

As a result of flue gas recirculation, the carbon dioxide partial pressure in the flue gases can advantageously be increased in order to reduce the power losses and efficiency losses of power plants with carbon dioxide separation. In addition, flue gas recirculation has been proposed with the aim of reducing the oxygen concentration in the intake gases of gas turbines in order to reduce the $NO_x$ emissions as a result.

For flue gas recirculation, U.S. Pat. No. 7,536,252 B1, for example, describes a method for controlling a flue gas recirculation flow of a turbomachine, which is recycled, via a flue gas recirculation system, to the intake of the turbomachine. In this method, a setpoint flue gas recirculation ratio is determined, wherein the flue gas recirculation ratio is defined as a ratio of the flue gas flow to the intake flow of the turbomachine, and the actual value is adjusted to the setpoint value.

A method for operating a gas turbine with flue gas recirculation is known from U.S. 2009/0145126, in which the flue gas composition is determined, and by a control element a controlling of the flue gas recirculation is carried out as a function of the measured flue gas composition.

Also, if known techniques separating of condensates is specified after recooling, the mixing of recooled recirculated flue gas with fresh ambient air can lead to renewed condensation and forming of drops. Depending upon ambient conditions, for example, temperature and relative air humidity of the inducted ambient air, and operating state of the gas turbine, a significant forming of drops can occur during this mixing. These drops can find their way into the compressor along with the inducted flow and lead to erosion damage.

SUMMARY

An exemplary embodiment of the present disclosure provides a method for operating a gas turbine plant with flue gas recirculation. The gas turbine plant includes a gas turbine, a heat recovery steam generator and a flue gas splitter. The exemplary method includes splitting, by the flue glass splitter, flue gases of the gas turbine power plant into a first flue gas flow for recirculation into an intake flow of the gas turbine, and into a second flue gas flow for discharging to the environment. The exemplary method includes controlling, by a control element, the first flue gas flow, and cooling, by a recooler, the first flue gas flow before its mixing with ambient air for forming the intake flow. In addition, after the first flue gas flow is cooled in the recooler and before the first flue gas flow is mixed with the ambient air, the method includes reheating the first glue gas flow to avoid condensation of vaporous water contained in the recycled flue gases during cooling as a result of mixing with the ambient air.

An exemplary embodiment of the present disclosure provides a gas turbine power plant with flue gas recirculation. The exemplary gas turbine power plant includes a gas turbine having a controller, a heat recovery steam generator, and a flue gas splitter configured to split flue gases into a first flue gas flow for recirculation into the intake flow of the gas turbine, and into a second flue gas flow for discharging to the environment. The exemplary gas turbine power plant also includes a control element configured to control the first flue gas flow, and a recooler configured to cool the first flue gas flow before its mixing with ambient air for forming the intake flow. In addition, the exemplary gas turbine power plant includes a heat exchanger configured to reheat the first flue gas flow, the heat exchanger being arranged in a recirculation line between the recooler and the mixing of the first flue gas flow with the intake flow of the gas turbine.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
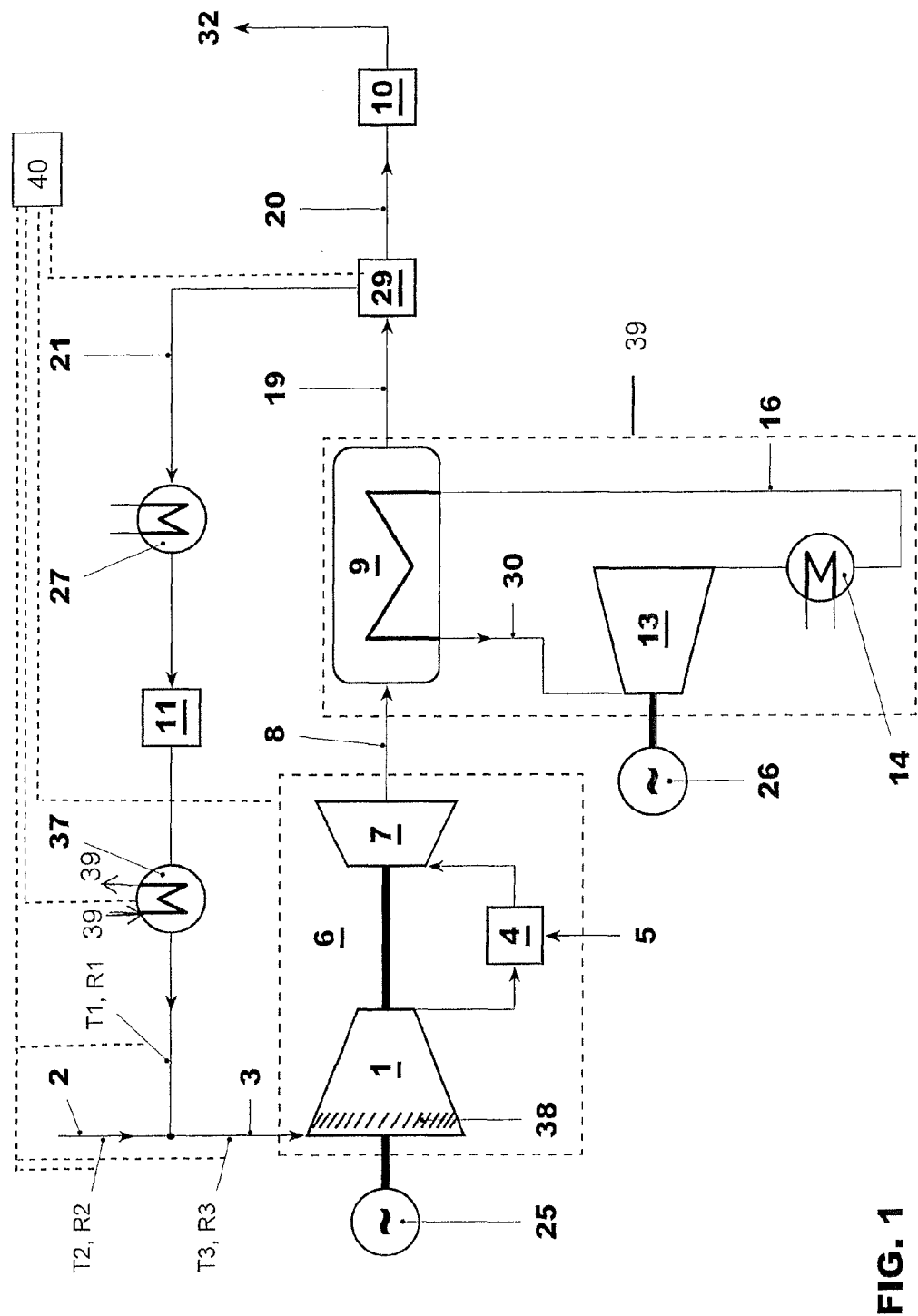
FIG. 1 shows a schematic representation of a gas turbine power plant with recycling of the flue gases, according to an exemplary embodiment of the present disclosure.

Exemplary embodiments of the present disclosure provide a method for the reliable operation of a gas turbine power plant with flue gas recirculation independently of the temperature and the relative air humidity of the ambient air.

An exemplary embodiment of the present disclosure provides a method for operating a gas turbine with flue gas recirculation, in which the recirculated flue gases, after being recooled and before being mixed with the ambient air for forming the intake flow, are reheated. The gas turbine process itself includes a method, in which a compressor inducts intake air on the inlet side and compresses it, for providing compressor exit air on the outlet side, a combustion chamber, in which by utilizing the compressor exit air a fuel is combusted, forming a hot gas, and also a turbine, in which the hot gas expands, performing work.

The method according to the present disclosure provides for the operation of a gas turbine power plant with flue gas recirculation, which includes a gas turbine, a heat recovery steam generator and a flue gas splitter, which splits the flue gases of the gas turbine power plant into a first flue gas flow for recirculation into the intake flow of the gas turbine and into a second flue gas flow for discharging to the environment, a control element for controlling the first flue gas flow, and a recooler for cooling the first flue gas flow before it is mixed with ambient air for forming the intake flow. It is distinguished by the fact that the first flue gas flow, after being recooled in the recooler and before being mixed with the ambient air, is reheated. As a result of this reheating, condensation of vaporous water contained within the recooled flue gases during cooling down as a consequence of mixing with the ambient air is avoided. The second flue gas flow can be discharged directly to the environment or is discharged following an aftertreatment. For example, $CO_2$ can be separated out from the second flue gas flow before the residual flow is discharged to the environment.

The temperature increase during the reheating of the recirculated flue gases is selected in this case so that the relative air humidity of the intake flow, which is created when mixing recirculated flue gases and ambient air, remains below 100%. Since a homogeneous mixture of recirculated flue gases and ambient air is difficult to realize in practice, the temperature increase is preferably selected to be greater so that during the mixing of recirculated flue gases and ambient air an intake flow which has a relative air humidity of less than 95% on average is obtained. For plants with poor mixing, the temperature increase is selected so that during the mixing of recirculated flue gases and ambient air an intake flow which has a relative air humidity of less than 90% or even less than 80% relative air humidity on average is obtained.

For reheating, for example waste heat of the water-steam cycle or of a cooler, for example, of a generator cooler, a cooling air cooler or an oil cooler, can be used.

According to an exemplary embodiment of the method, the temperature increase as a result of reheating is controlled in dependence upon the temperature of the inducted ambient air. The lower the temperature of the inducted ambient air is, the more intensely cooled is the recirculated flue gas during the mixing and more easily can moisture condense. In order to avoid this, the recirculated flue gas is reheated more intensely the colder the inducted ambient air is.

Furthermore, the risk of condensation during mixing is dependent upon the relative air humidity of the inducted ambient air. The higher the relative air humidity of the inducted ambient air, the easier moisture can condense during the mixing. According to one embodiment of the method, the temperature increase as a result of reheating is therefore controlled in dependence upon the relative air humidity of the inducted ambient air.

In accordance with an exemplary embodiment of the method, the reheating is controlled in dependence upon the temperature and the relative air humidity of the inducted ambient air.

The mixing, and especially a possible oversaturation as a result of the mixing, is greatly dependent upon the flue gas recirculation rate, for example, upon the ratio of recirculated flue gas flow to the overall flue gas flow or to the overall compressor intake flow. In accordance with an exemplary embodiment, the reheating is therefore controlled in dependence upon the flue gas recirculation rate. In one embodiment, the reheating is controlled in dependence upon the flue gas recirculation rate and the temperature of the ambient air and/or upon the relative air humidity of the ambient air.

In accordance with an exemplary embodiment, the first partial flue gas flow is saturated with moisture after being recooled. The absolute moisture content, and therefore also the risk of condensation, is therefore also dependent upon the temperature of the first partial flue gas flow after being recooled. According to an exemplary embodiment of the method, the temperature increase as a result of reheating is controlled in dependence upon the temperature of the first partial flue gas flow after being recooled.

Depending upon operating conditions and recooling, the relative humidity in the recirculated flue gases can be below 100%, however. In order to be able to restrict the reheating to a minimum under these conditions, according to an exemplary embodiment of the method, the temperature increase as a result of reheating is controlled in dependence upon the relative air humidity of the first partial flue gas flow after being recooled.

Alternatively or in combination with the temperatures and relative humidities of the inducted ambient air and the recirculated flue gases, the temperature increase as a result of reheating can also be controlled in dependence upon the temperature of the compressor intake flow after the mixing of recooled recirculated flue gas with fresh ambient air.

Furthermore, in accordance with an exemplary embodiment of the method, the temperature increase as a result of reheating is controlled in dependence upon the relative air humidity of the compressor intake flow.

In accordance with an exemplary embodiment, the temperature increase as a result of reheating is controlled so that the relative air humidity of the compressor intake flow is less than 100%.

In accordance with an exemplary embodiment, which offers higher security against condensation, especially in the case of inhomogeneous mixing, the temperature increase as a result of reheating is controlled so that the relative air humidity of the compressor intake flow is less than 95%.

On account of the risk of condensation on a sensor for measuring the relative humidity it is difficult in practice to measure a relative air humidity of close to 100% in a virtually saturated flow. Therefore, in accordance with an exemplary embodiment of the method, the air humidity in the intake flow after the mixing of recooled recirculated flue gas with fresh ambient air is calculated from other measurements and/or operating parameters. These, for example, are the temperatures and mass flows of recooled recirculated flue gas and of fresh ambient air.

Furthermore, the compressor inlet state can also be calculated on account of process variables which are measured in the compressor. To this end, for example the relative humidity, the temperature and the pressure at the compressor exit or in a cooling air flow branched from the compressor can be measured and therefore the inlet conditions can be approximated.

In accordance with an exemplary, the absolute humidity during compression does not alter. The relative and absolute humidity can be measured without any problem in the compressor or in a branch of the compressor since the relative air humidity during compression drops quickly on account of the heating and compression. The problems associated with measuring techniques, which are encountered in the case of saturated gases, do not therefore occur.

If water is fed into the compressor, for example for power augmentation, then the water flow which is fed in relation to the intake mass flow must be discounted in the calculation of the absolute inlet humidity.

With a measurement of the compressor inlet temperature and of the absolute humidity, the relative humidity can be calculated. The compressor inlet temperature itself can be approximated via the pressure ratio and known compressor characteristics emanating from the state variables in the compressor. This can be advantageous if the reliability of an inlet temperature measurement is impaired as a result of condensation on the temperature measuring device. Also, the air is mixed through right up to the compressor exit so that a mixture temperature can be reliably measured using only one measuring point, or only a few measuring points. Since a homogeneous mixture of ambient air and typically hotter recirculated flue gases at the compressor inlet is practically impossible, measuring the mixing temperature at the compressor inlet is only possible using a large number of measuring points and with corresponding high cost.

In the compressor inlet, the intake air is sharply accelerated so that condensation can occur in the first stage. This acceleration, in modern gas turbines which have at least one compressor variable inlet guide vane row, is dependent upon the deflection in the at least one compressor variable inlet guide vane row. According to an exemplary embodiment of the method, the temperature increase as result of reheating is therefore controlled in dependence upon the position of the compressor variable inlet guide vane row.

The method is applicable to gas turbines, for example, which include a compressor, or a plurality of compressors, a combustion chamber and a turbine, wherein the compressor compresses intake gases, fuel is combusted in the combustion chamber along with the compressed gases, forming a hot gas, this gas is expanded in the turbine, performing work, and the turbine drives the compressor and delivers useful power.

It is also applicable to gas turbines with sequential combustion, for example, gas turbines which include a compressor, or a plurality of compressors, a first combustion chamber, a high-pressure turbine, a second combustion chamber (sequential combustion chamber) and a low-pressure turbine.

Furthermore, it is applicable to gas turbines with sequential combustion, for example, gas turbines which include a compressor, or a plurality of compressors, a first combustion chamber, a high-pressure turbine, a second combustion chamber (sequential combustion chamber) and a low-pressure turbine.

In addition to the method, a gas turbine power plant for implementing the method with flue gas recirculation is also provided. Such a power plant includes a gas turbine with a compressor, combustion chamber, turbine, a controller 40, a heat recovery steam generator and a flue gas splitter which splits the flue gases into a first flue gas flow for recirculation into an intake flow of the gas turbine and into a second flue gas flow for discharging to the environment, and also a control element for controlling the distribution of the flue gas mass flows. According to an exemplary embodiment of the present disclosure, such a power plant is distinguished by the fact that in addition to a heat exchanger for recooling of the recirculated flue gases it includes a heat exchanger in a recirculation line between the recooler and the mixing of the first flue gas flow with the intake flow, for reheating the recirculated flue gases after being recooled.

As a recooler, for example a heat exchanger operating with cold water, a surface irrigation cooler or a spray cooler can be used. The use of surface irrigation coolers or spray coolers has the advantage that the required temperature difference is very small, and the recirculated gas is scrubbed at the same time and therefore potentially harmful contaminants are removed before the reintroduction of recirculated gases into the gas turbine.

According to an exemplary embodiment of the present disclosure, the gas turbine plant includes at least one measuring instrument for measuring a temperature and/or a relative air humidity between the recooler and the mixing of the first flue gas flow with the intake flow. This can be arranged upstream or downstream of the heat exchanger for reheating the first flue gas flow.

According to an exemplary embodiment, the gas turbine plant according to the present disclosure includes measuring instruments for measuring a temperature and/or a relative air humidity between the mixing of the first flue gas flow with the intake flow and the compressor inlet.

Furthermore, the gas turbine power plant can include measuring instruments for measuring a temperature and/or a relative air humidity of the ambient air which is inducted from the environment.

In order to be able to utilize waste heat for reheating the first flue gas flow, the heat exchanger for reheating the first flue gas flow is connected via lines to the water-steam cycle, to a cooling circuit of a generator, of a cooling air cooler 42 of the gas turbine plant, or of an oil cooler 41.

All the explained advantages are applicable not only in the respectively disclosed combinations but also in other combinations or in isolation without departing from the scope of the disclosure. For example, instead of measuring the relative humidity after the reheating, the relative humidity and temperature upstream of the recooler, the mass flow of the recirculated flue gases, the amount of condensate deposited in the recooler and the temperature after reheating, can be measured and therefore the relative humidity can be calculated.

FIG. 1 shows in a schematic representation the essential elements of a gas turbine power plant according to the disclosure. The gas turbine 6 includes a compressor 1, wherein combustion air which is compressed therein is fed to a combustion chamber 4 where it is combusted with fuel 5 there. The hot combustion gases are then expanded in a turbine 7. The useful energy which is produced in the turbine 7 is then converted into electric energy by a first generator 25, for example, which is arranged on the same shaft. The compressor intake flow 3 of the compressor 1 is controlled via the compressor variable inlet guide vanes 38.

The hot flue gases 8 which issue from the turbine 7 are used for the optimum utilization of the energy still contained therein in a heat recovery steam generator (HRSG) 9 for producing live steam 30 for a steam turbine 13 or for other plants. The useful energy which is produced in the steam turbine 13 is converted into electric energy by a second generator 26, for example, which is arranged on the same shaft. The water-steam cycle 39 is simplified in the example and represented only schematically with a condenser 14 and feedwater line 16. Various pressure stages, feed-water pumps, etc., are not shown since these are not subjects of the disclosure.

The flue gases 19 from the heat recovery steam generator 9 are split downstream of the heat recovery steam generator 9 in a flow splitter 29 into a first partial flue gas flow 21 and a second partial flue gas flow 20. The first partial flue gas flow 21 is recycled into the intake line of the gas turbine 6 and mixed with ambient air 2 there. The second partial flue gas flow 20, which is not recycled, is discharged to the environment via an exhaust stack 32. In order to overcome the pressure losses of the flue gas line and as a further control possibility of distributing the flue gas flows, a flue gas blower 11, or a controllable flue gas blower 11, can optionally be provided.

In the depicted example, the flow splitter 29 is designed as a control element which allows the recirculation flow to be controlled.

During operation with recirculation, the recycled flue gas flow 21 is cooled—for example, to slightly above ambient temperature—in a flue gas cooler 27 which can be equipped with a condenser. Downstream of this flue gas cooler 27, a booster or flue gas blower 11 for the recirculation flow 21 can be arranged. This recycled flue gas flow 21 is reheated in the heat exchanger 37 in order to reduce its relative humidity before it is mixed with the ambient air 2 and fed to the gas turbine 6 as compressor intake flow 3.

Figure 2:
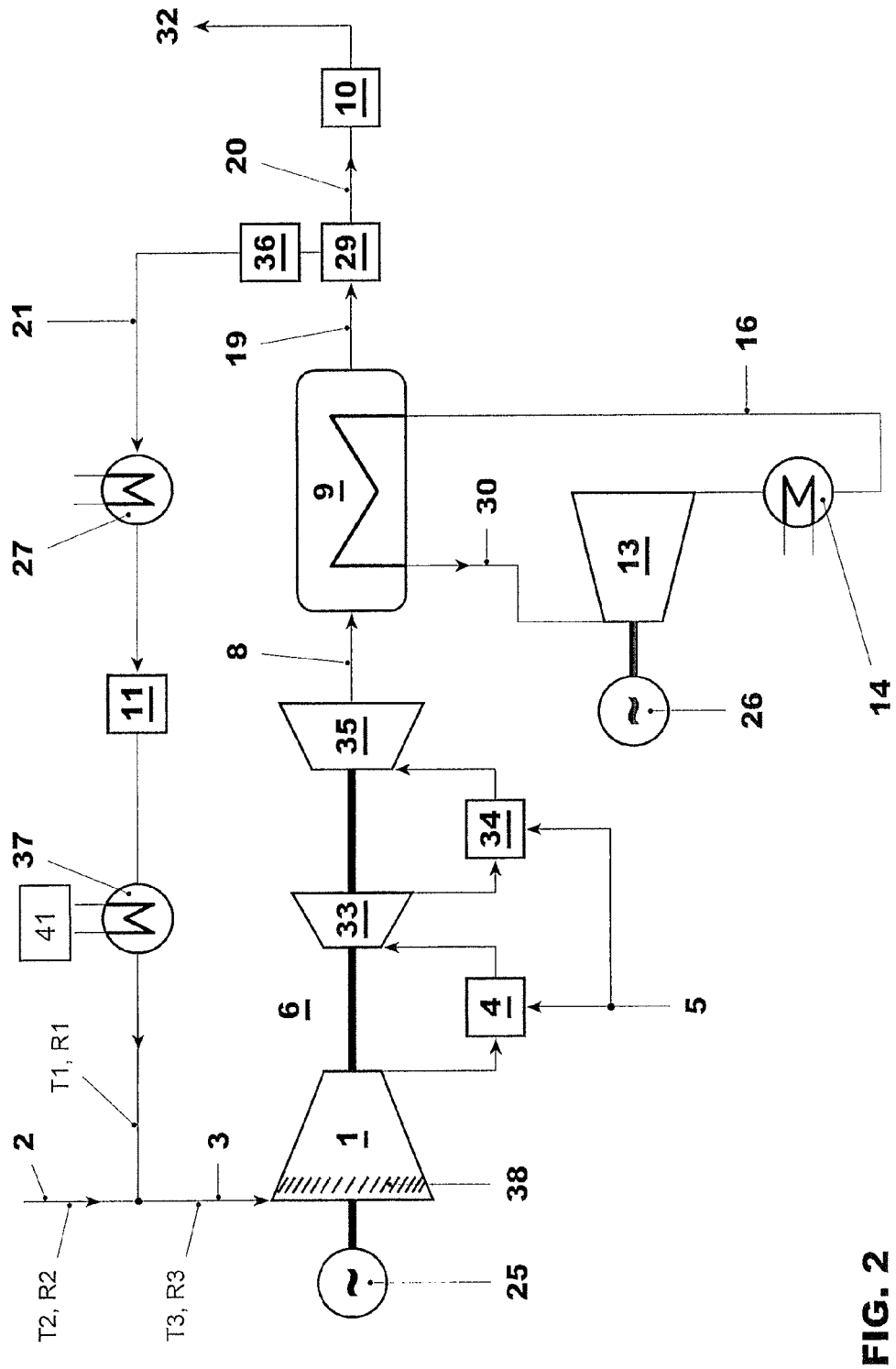
FIG. 2 shows a schematic representation of a gas turbine power plant with a gas turbine with sequential combustion and recycling of the flue gases, according to an exemplary embodiment of the present disclosure.

The example in FIG. 1 shows a gas turbine 6 with a single combustion chamber 4. The disclosure is also applicable, without limitation, to gas turbines with sequential combustion, as are known from EP 0718470, for example. Schematically shown in FIG. 2 is an example of a gas turbine power plant with sequential combustion and flue gas recirculation. In the case of this gas turbine, a high-pressure turbine 33 follows the combustion chamber 4. In the second combustion chamber 34, fuel 5 is again added to the partially expanded flue gases—which perform work—of the high-pressure turbine 33 and combusted. The hot combustion gases of the second combustion chamber 34 are further expanded in the low-pressure turbine 35, performing work. The utilization of the waste heat and also the recirculation and the reheating are carried out in a way corresponding to the exemplary embodiment from FIG. 1. Just one additional control element 36 is provided for controlling the recirculation flow in the recirculation line. In this arrangement, the flow splitter 29 can be designed without a control function.

Figure 3:
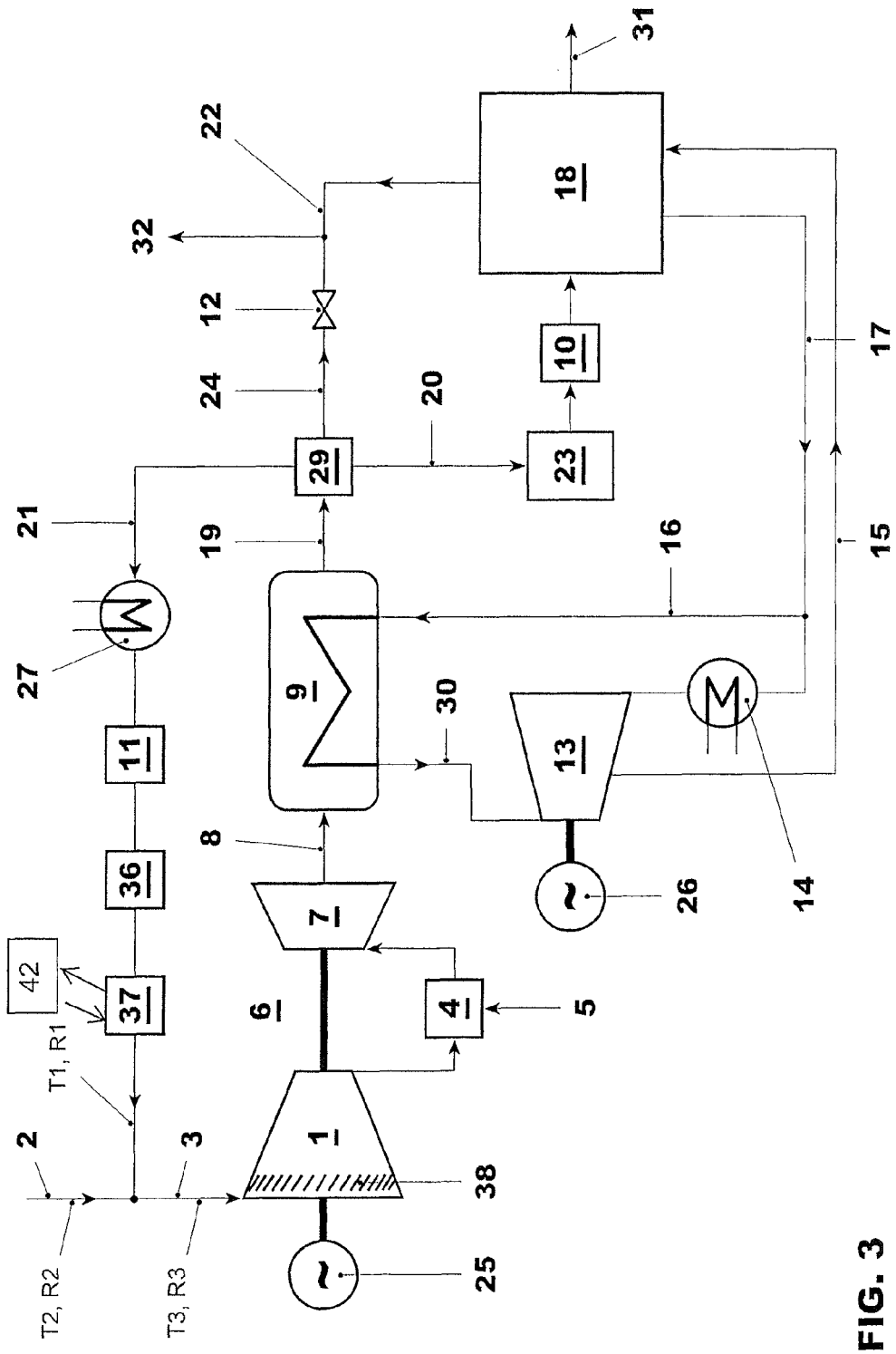
FIG. 3 shows a schematic representation of a gas turbine power plant with a gas turbine with sequential combustion and recycling of the flue gases and a carbon dioxide separation system, according to an exemplary embodiment of the present disclosure.

In FIG. 3, based on FIG. 1, a carbon dioxide separation system 18 is shown in addition. The second partial flue gas flow 20, which is not recycled, may be further cooled in a flue gas recooler 23 and fed to the carbon dioxide separation system 18. From this, carbon dioxide-impoverished flue gases 22 are discharged to the environment via an exhaust stack 32. In order to overcome the pressure losses of the carbon dioxide separation system 18 and of the flue gas line, a flue gas blower 10 can be provided. The carbon dioxide 31 which is separated in the carbon dioxide separation system 18 may be compressed in a compressor and discharged for storage or further treatment. The carbon dioxide separation system 18, via a steam extraction line 15, is supplied with steam, for example, intermediate-pressure steam or low-pressure steam, which is branched from the steam turbine 13. The steam is fed again to the water-steam cycle after yielding energy in the carbon dioxide separation system 18 in the form of liquid water or as steam, or water-steam mixture. In the depicted example, the steam is condensed and fed to the feed water via the condensate return line 17.

The second partial flue gas flow can also be routed directly to the exhaust stack 32 via a flue gas bypass 24, which includes a bypass flap or valve 12.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1 Compressor
2 Ambient air
3 Compressor intake flow
4 Combustion chamber, first combustion chamber
5 Fuel
6 Gas turbine
7 Turbine
8 Hot flue gases of the gas turbine
9 Heat recovery steam generator (HRSG)
10 Flue gas blower for the second partial flue gas flow (to the carbon dioxide separation system or exhaust stack)
11 Flue gas blower for the first partial flue gas flow (flue gas recirculation)
12 Bypass flap or valve
13 Steam turbine
14 Condenser
15 Steam extraction line for the carbon dioxide separation system
16 Feed water line
17 Condensate return line
18 Carbon dioxide separation system
19 Flue gas from the heat recovery steam generator
20 Second partial flue gas flow
21 First partial flue gas flow (flue gas recirculation)
22 Carbon dioxide-impoverished flue gas
23 Flue gas recooler (for the second partial flue gas flow)
24 Flue gas bypass to the exhaust stack
25 First generator
26 Second generator
27 Flue gas recooler (for the first partial flue gas flow)
29 Flue gas splitter
30 Live steam
31 Separated carbon dioxide
32 Exhaust stack
33 High-pressure turbine
34 Second combustion chamber
35 Low-pressure turbine
36 Control element
37 Heat exchanger
38 Compressor variable inlet guide vane row
39 Water-steam cycle
40 Controller
41 Oil cooler
42 Cooling air cooler
T1 Temperature after reheating
T2 Temperature of the inducted ambient air
T3 Temperature of the compressor intake flow
R1 Relative air humidity after reheating
R2 Relative air humidity of the inducted ambient air
R3 Relative air humidity of the compressor intake flow

What is claimed is:

1. A method for operating a gas turbine power plant with flue gas recirculation, the gas turbine power plant including a gas turbine having a controller, a heat recovery steam generator and a flue gas splitter, the method comprising:
splitting, by the flue gas splitter, flue gases of the gas turbine power plant into a first flue gas flow for recirculation into an intake flow of the gas turbine, and into a second flue gas flow for discharging to the environment;
controlling, by a control element, the first flue gas flow;
cooling, by a recooler, the first flue gas flow before mixing the first flue gas flow with ambient air for forming the intake flow; and
after the first flue gas flow is cooled in the recooler and before the first flue gas flow is mixed with the ambient air, reheating the first flue gas flow in a heat exchanger to avoid condensation of vaporous water contained in the first flue gas flow during cooling as a result of mixing with the ambient air, the heat exchanger being arranged in a recirculation line between the recooler and a location at which the mixing of the first flue gas flow with the intake flow occurs.

2. The method as claimed in claim 1, wherein a temperature increase as a result of the reheating of the first flue pas flow is controlled in dependence upon a temperature of the ambient air.

3. The method as claimed in claim 1, wherein a temperature increase as a result of the reheating of the first flue pas flow is controlled in dependence upon a relative humidity of the ambient air.

4. The method as claimed in claim 1, wherein a temperature increase as a result of the reheating of the first flue pas flow is controlled in dependence upon a ratio of a mass flow of the first flue pas flow to an overall flue gas mass flow.

5. The method as claimed in claim 1, wherein a temperature increase as a result of the reheating of the first flue pas flow is controlled in dependence upon a temperature of the first flue gas flow after being recooled.

6. The method as claimed in claim 1, wherein a temperature increase as a result of the reheating of the first flue pas flow is controlled in dependence upon a relative humidity of the first flue gas flow after being recooled.

7. The method as claimed in claim 1, wherein a temperature increase as a result of the reheating of the first flue pas flow is controlled in dependence upon a temperature of the intake flow.

8. The method as claimed in claim 1, wherein a temperature increase as a result of the reheating of the first flue gas flow is controlled in dependence upon a relative humidity of the intake flow.

9. The method as claimed in claim 8, wherein the temperature increase is controlled so that the relative humidity of the intake flow is less than 100%.

10. The method as claimed in claim 8, wherein the temperature increase is controlled so that the relative humidity of the intake flow is less than 95%.

11. The method as claimed in claim 7, wherein at least one of the temperature of the intake flow and a relative humidity of the intake flow is calculated from pressure measurements, temperature measurements and moisture measurements at an exit of a compressor or at an intermediate stage of the compressor.

12. The method as claimed in claim 1, wherein a temperature increase as a result of the reheating of the first flue gas flow is controlled in dependence upon a position of a compressor variable inlet guide vane row.

13. The method as claimed in claim 2, wherein the temperature increase is controlled in dependence upon a relative humidity of the ambient air.

14. The method as claimed in claim 13, wherein the temperature increase is controlled in dependence upon a ratio of a mass flow of the first flue pas flow to an overall flue gas mass flow.

15. The method as claimed in claim 13, wherein the temperature increase is controlled in dependence upon a temperature of the first flue gas flow after being recooled.

16. The method as claimed in claim 13, wherein the temperature increase is controlled in dependence upon a relative humidity of the first flue gas flow after being recooled.

17. The method as claimed in claim 13, wherein the temperature increase is controlled in dependence upon a temperature of the intake flow.

18. The method as claimed in claim 13, wherein the temperature increase is controlled in dependence upon a relative humidity of the intake flow.

19. The method as claimed in claim 13, wherein the temperature increase is controlled in dependence upon a position of a compressor variable inlet guide vane row.

20. The method as claimed in claim 8, wherein at least one of a temperature of the intake flow and the relative humidity of the intake flow is calculated from pressure measurements, temperature measurements and moisture measurements at an exit of a compressor or at an intermediate stage of the compressor.

21. A gas turbine power plant with flue gas recirculation, comprising:
a gas turbine having a controller;
a heat recovery steam generator;
a flue gas splitter configured to split flue gases into a first flue gas flow for recirculation into an intake flow of the gas turbine, and into a second flue gas flow for discharging to the environment;
a control element configured to control the first flue gas flow;
a recooler configured to cool the first flue gas flow before mixing the first flue gas flow with ambient air for forming the intake flow; and
a heat exchanger configured to reheat the first flue gas flow before mixing the first flue gas flow with the ambient air in order to avoid condensation, the heat exchanger being arranged in a recirculation line between the recooler and a location at which the mixing of the first flue gas flow with the intake flow occurs.

22. The gas turbine power plant with flue gas recirculation as claimed in claim 21, comprising:
measuring instruments configured to measure at least one of a temperature and a relative humidity downstream of the heat exchanger.

23. The gas turbine power plant with flue gas recirculation as claimed in claim 21, wherein the heat exchanger is connected to a water-steam cycle or one of a cooling air cooler and an oil cooler.

24. The gas turbine power plant with flue gas recirculation as claimed in claim 21, wherein the heat exchanger is connected to a cooling circuit of one of a cooling air cooler and an oil cooler.

25. The gas turbine power plant with flue gas recirculation as claimed in claim 21, wherein the controller is configured to control a temperature increase as a result of reheating the first flue gas flow by the heat exchanger in dependence upon a temperature of the ambient air.

26. The gas turbine power plant with flue gas recirculation as claimed in claim 21, wherein the controller is configured to control a temperature increase as a result of reheating the first flue gas flow by the heat exchanger in dependence upon a relative humidity of the ambient air.

27. The gas turbine power plant with flue gas recirculation as claimed in claim 21, wherein the controller is configured to control a temperature increase as a result of reheating the first flue gas flow by the heat exchanger in dependence upon a ratio of a mass flow of the first flue pas flow to an overall flue gas mass flow.

28. The gas turbine power plant with flue gas recirculation as claimed in claim 21, wherein the controller is configured to control a temperature increase as a result of reheating the first flue gas flow by the heat exchanger in dependence upon a temperature of the first flue gas flow after being recooled.

29. The gas turbine power plant with flue gas recirculation as claimed in claim 21, wherein the controller is configured to control a temperature increase as a result of reheating the first flue gas flow by the heat exchanger in dependence upon a relative humidity of the first flue gas flow after being recooled.

30. The gas turbine power plant with flue gas recirculation as claimed in claim 21, wherein the controller is configured to control a temperature increase as a result of reheating the first flue gas flow by the heat exchanger in dependence upon a temperature of the intake flow.

31. The gas turbine power plant with flue gas recirculation as claimed in claim 21, wherein the controller is configured to control a temperature increase as a result of reheating the first flue gas flow by the heat exchanger in dependence upon a relative humidity of the intake flow.

32. The gas turbine power plant with flue gas recirculation as claimed in claim 31, wherein the controller is configured to control the temperature increase so that the relative humidity of the intake flow is less than 100%.

33. The gas turbine power plant with flue gas recirculation as claimed in claim 31, wherein the controller is configured to control the temperature increase so that the relative humidity of the intake flow is less than 95%.

34. The gas turbine power plant with flue gas recirculation as claimed in claim 30, wherein at least one of the temperature of the intake flow and a relative humidity of the intake flow is calculated from pressure measurements, temperatures measurements and moisture measurements at an exit of a compressor or at an intermediate stage of the compressor taken by at least one measuring unit.

35. The gas turbine power plant with flue gas recirculation as claimed in claim 21, wherein the controller is configured to control a temperature increase as a result of reheating the first flue gas flow by the heat exchanger in dependence upon a position of a compressor variable inlet guide vane row.

36. The gas turbine power plant with flue gas recirculation as claimed in claim 21, wherein the gas turbine includes a compressor, and a temperature increase as a result of reheating the first flue gas flow by the heat exchanger is controlled in dependence upon a position of a compressor variable inlet guide vane row.

37. The gas turbine power plant with flue gas recirculation as claimed in claim 21, wherein the gas turbine includes a compressor, and at least one of a temperature of the intake flow and a relative humidity of the intake flow is calculated from pressure measurements, temperature measurements and moisture measurements at an exit of the compressor or at an intermediate stage of the compressor taken by at least one measuring instrument.

* * * * *